United States Patent
Platte et al.

(10) Patent No.: US 10,775,257 B2
(45) Date of Patent: Sep. 15, 2020

(54) DEVICE AND METHOD FOR DYNAMICALLY CALIBRATING PRESSURE SENSORS

(71) Applicant: SPEKTRA SCHWINGUNGSTECHNIK UND AKUSTIK GMBH DRESDEN, Dresden (DE)

(72) Inventors: Thomas Platte, Dresden (DE); Martin Brucke, Dresden (DE); Martin Iwanczik, Dresden (DE)

(73) Assignee: SPEKTRA SCHWINGUNGSTECHNIK UND AKUSTIK GMBH DRESDEN, Dresden (DE)

( * ) Notice: Subject to any disclaimer, the term of this patent is extended or adjusted under 35 U.S.C. 154(b) by 0 days.

(21) Appl. No.: 16/335,749

(22) PCT Filed: Sep. 25, 2017

(86) PCT No.: PCT/EP2017/001137
§ 371 (c)(1),
(2) Date: Mar. 22, 2019

(87) PCT Pub. No.: WO2018/054540
PCT Pub. Date: Mar. 29, 2018

(65) Prior Publication Data
US 2019/0234824 A1  Aug. 1, 2019

(30) Foreign Application Priority Data
Sep. 23, 2016 (DE) .................. 10 2016 118 048

(51) Int. Cl.
*G01L 27/00* (2006.01)
(52) U.S. Cl.
CPC .................. *G01L 27/005* (2013.01)

(58) Field of Classification Search
CPC ........................... G01L 27/002; G01L 27/005
See application file for complete search history.

(56) References Cited

U.S. PATENT DOCUMENTS 3,590,626 A * 7/1971 Hugli .................... G01L 27/005
                                                                    73/1.67
4,499,751 A * 2/1985 Riggs .................... G01L 27/005
                                                                    73/1.67

FOREIGN PATENT DOCUMENTS

DE       10018493 C1 * 10/2001    .......... G01L 27/005
DE       10018493 C1    10/2001
(Continued)

OTHER PUBLICATIONS

"Micro Dynamic Pressure Calibration with Frequency Method" Jun et al. ICEMI 2011 pp. 364-368 (Year: 2011).*
(Continued)

*Primary Examiner* — Nathaniel J Kolb
(74) *Attorney, Agent, or Firm* — Heslin Rothenberg Farley and Mesiti PC; Nicholas Mesiti

(57) ABSTRACT

The invention relates to a device and to a method for dynamically calibrating pressure sensors. Pressure acting upon the pressure sensor is compared to a corresponding desired parameter by means of a device according to the pistonphone principle, from which a calibration value c is determined. The aim of the invention is to provide a method and solution which enables a primary calibration of the dynamic ratio of a pressure sensor to be carried out. This is achieved by the fact that the device is only statically determined by respectively a housing to actuator connection and actuator to piston connection, and the piston is sealed in the cylinder with respect to the ambient atmosphere by a seal and is moveably arranged in the seal, and the change in pressure corresponding to the actual valve is calculated.

18 Claims, 5 Drawing Sheets

(56) References Cited

FOREIGN PATENT DOCUMENTS

Figure 1:
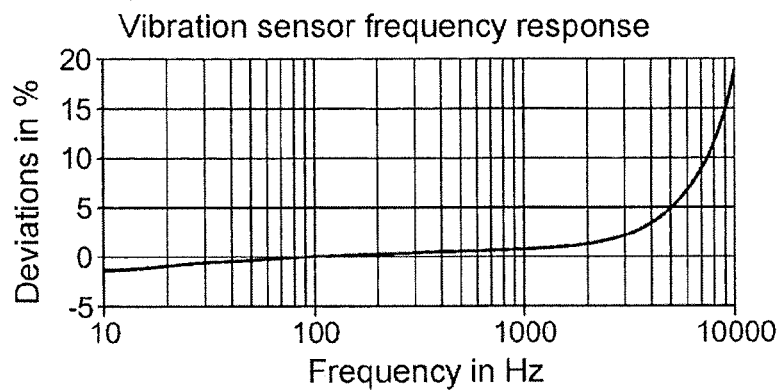

| | | |
|---|---|---|
| DE | 102009027624 A1 | 1/2010 |
| JP | 2005345215 A | 12/2005 |
| JP | 2009300383 A | 12/2009 |
| UA | 22347 U | 4/2007 |
| WO | 2013110255 A1 | 8/2013 |

OTHER PUBLICATIONS

International Search Report issued in Russian Application No. 2019112193 dated Jan. 27, 2020.
International Preliminary Report on Patentability (and English translation) for International Application No. PCT/EP2017/001137 dated Mar. 26, 2019.
International Search Report issued in PCT/EP2017/001137 dated Mar. 8, 2018.

* cited by examiner

DEVICE AND METHOD FOR DYNAMICALLY CALIBRATING PRESSURE SENSORS

CROSS REFERENCE TO RELATED APPLICATIONS

This application is the National Phase filing under 35 U.S.C. § 371 of International Application No.: PCT/EP2017/001137, filed on Sept. 25, 2017, and published on Mar. 29, 2018 as WO 2018/054540 A1 and republished with Article 19 Amendments as WO2018/054540 A4, which claims priority to German Application No.: 10 2016 118 048.3, filed on Sept. 23, 2016. The contents of each of the prior applications are hereby incorporated by reference herein in their entirety.

The invention relates to a device for dynamically calibrating pressure sensors having a housing, a cylinder, connected to the housing, for receiving a fluid, which cylinder is able to be connected to a first pressure sensor, an actuator and a piston interacting with the cylinder. In this case, the actuator is arranged between the housing and a side, facing away from the cylinder, of the piston.

The actuator that is used in this case converts an input signal into a mechanical movement. By way of example, this may in this case be a piezoelectric actuator that mechanically deforms when a voltage is applied. This mechanical deformation may then be transferred to the piston in the form of a mechanical movement.

The invention also relates to a method for dynamically calibrating pressure sensors, wherein an actual parameter representing the pressure acting on a pressure sensor is measured and compared with a corresponding setpoint parameter. A calibration value c for the actual parameter is determined from the comparison, the pressure being generated by way of a piston interacting with a cylinder that is filled with a fluid.

A pressure sensor of the type in question here serves to determine a pressure of a fluid. It may be used for example to determine the oil pressure or the brake fluid pressure in motor vehicles. In this case, a physical output variable corresponding to the pressure, for example a value, corresponding to the pressure, of an electric voltage, is generated at the output of the pressure sensor.

BACKGROUND ART

The ratio of pressure to output variable may be different between pressure sensors according to manufacture. This relates to both static ratio fluctuations, the different behavior at different static pressures, and differences in the dynamic behavior, that is to say differences between different pressure sensors in terms of their frequency response at dynamically changing pressures.

In order to arrive at a correct assessment of the output variable, there is therefore a need to calibrate the pressure sensor in terms both of its static and of its dynamic behavior. The invention described below relates to calibrating the dynamic behavior of pressure sensors.

Calibration is understood to mean a method in which the deviation of a sensor from a normal is determined in a first step, so as, in a second step, to use the determined deviation in the subsequent use of the sensor in order to correct the values determined thereby.

It is known to dynamically calibrate vibration sensors, inter alia by way of the service provided by the applicant. In this case, a vibration sensor to be calibrated is excited by narrowband or broadband signals. In narrowband excitation, the vibration sensors are excited with a sinusoidal signal that is as undisturbed as possible. In broadband excitation, the vibration sensors are generally excited with impacts.

During excitation with sinusoidal signals, the response, for example the voltage output U of the vibration sensor, is able to be measured. This is put into a ratio, with the known excitation, that is to say the acceleration a, and the sensitivity of the sensor is obtained:

$$s = \frac{U}{a} = \left[\frac{V}{m/s^2}\right].$$

Due to the construction principle of the vibration sensor, this sensitivity is however dependent on the frequency. If the frequency of the excitation is varied, the frequency response of the vibration sensor may be recorded as is illustrated in FIG. 1. The frequency response assists in evaluating the frequency up to which the vibration sensor is able to be used in a real measurement application, and the frequency from which deviations in the measured values have to be taken into consideration.

In metrology, a distinction is drawn between two types of calibration, secondary and primary calibration.

The known determination of the frequency response of a vibration sensor is performed through a primary calibration.

In primary calibration, the physical variable that is sought is calculated from other variables. If it is intended for example to determine the mass of a fluid in a primary manner, then the density ρ thereof may be measured or determined as a material constant from tables, and the volume V of the fluid may be measured. The mass m is able to be calculated using the equation $$m = V \cdot \rho.$$

The variables entering into the equation are in this case generally able to be determined very accurately and ensure that the variable to be determined is able to be calculated very accurately.

In a secondary calibration, only two variables are compared with one another. This is thus a comparative calibration. For the example illustrated in FIG. 2, this means that the use of a beam balance for determining the sought mass m2 is a comparative measurement. If the upper beam 1 is horizontal, this means, if the lever arms are of the same length, that the mass m2 is the same as the known mass m1. The mass m2 is then determined and may be given, with the tolerances of the measurement system, by $$m_2 = m_1.$$

Such a secondary calibration is known for determining the frequency response of pressure sensors.

To this end, dynamic pressure generators are known that are always equipped with a comparison sensor and therefore serve for secondary calibration, as described above. Such a dynamic pressure generator is known from numerous publications, such as Kuhn; Werthschützky: Analysis of Dynamic Characteristics of Pressure Sensors, EMK TU Darmstadt, Stefan Sindlinger: Einfluss der Gehäusung auf die Messunsicherheit von mikrogehäusten Drucksensoren mit piezoresistivem Messelement (Influence of the Housing on the Measurement Uncertainty of Microencapsulated Pressure Sensors having a Piezoresistive Measurement Element), dissertation, EMK TU Darmstadt, 2007

Sven Kuhn: Messunsicherheit elektromechanischer Wirkprinzipien zur Druckmessung and Optimierung von Verfahren zur Fehlerkorrektur (Measurement Uncertainty of Electromechanical Active Principles for Pressure Measurement and Optimization of Methods for Error Correction), dissertation, EMK TU Darmstadt, 2001, Timo Kober: Analyse des Übertragungsverhaltens von Differenzdrucksensoren durch dynamische Druckkalibrierung (Analysis of the Transfer Behavior of Differential Pressure Sensors through Dynamic Pressure Calibration), article in Technisches Messen (Technical Measurement) February 2010, Luca Tomasi: A new micromachined piezoresistive pressure sensor with dual range and self-test functionalities, dissertation, 2007 or Adam Hurst: An Experimental Frequency Response Characterization of MEMS Piezoresistive Pressure Transducers, Proceedings of ASME Turbo Expo 2014: Turbine Technical Conference and Exposition, 2014

Figure 3:
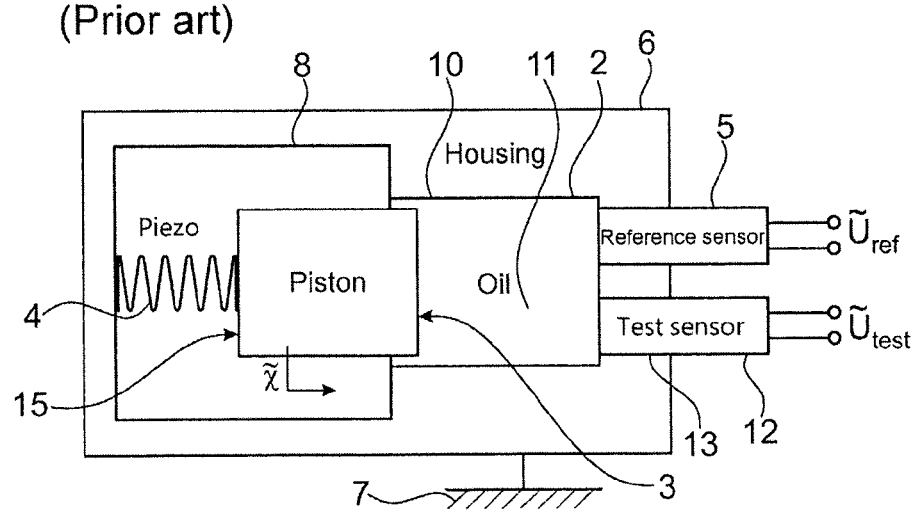

These solutions may be schematically summarized in the illustration according to FIG. 3.

In this case, a pressure p is generated in a control volume 2 by way of a diaphragm 3. A piezoelectric actuator 4 is connected to this diaphragm 3 by way of a piston 8. If a voltage is applied to the piezoelectric actuator 4, said piezoelectric actuator expands. The expansion causes the diaphragm 3 to move. The diaphragm 3 compresses the oil with which the control volume 2 is filled and brings about a pressure increase.

Due to the properties of the piezoelectric actuator 4, the above-described development goals are able to be met using this method. The frequency of the generated pressure p may be varied by way of the frequency of the applied actuator voltage. The amplitude of the pressure p may be controlled by way of the amplitude of the voltage.

As already described, a comparison sensor 5 is also provided in this arrangement. The comparison sensor 5 has unknown dynamics. Due to its construction, very good dynamics of the comparison sensor 5 are however assumed. With reference to FIG. 1, this means that the deviation in the sensitivity over all frequencies corresponds to 0%. The reference value is the statically determined sensitivity of the comparison sensor 5.

In addition to the fact that the known pressure generator is provided for a secondary calibration, it has proven that the structure, which makes provision for the housing to be stationary, that is to say fixedly connected to a base, leads to the housing exerting uncontrolled and strong vibrations, as a result of which use for a primary calibration, in which the pressure p has to be calculated, is prohibited due to the large interfering influence on the pressure calculation. As illustrated in the mechanical circuit diagram according to FIG. 4, the housing 6 is fixedly connected to a base 7. This is intended to achieve a situation whereby only movement of the piston 8 is possible. The movement on the opposing side of the piston 8 and of the housing 6 is intended to be prevented by the base 7 and the connection of the housing 6 to the base 7, for example by way of a crossbeam 9. The base 7 in this case has a mass that is at least one order of magnitude greater than the mass of the housing 6.

Figure 5:
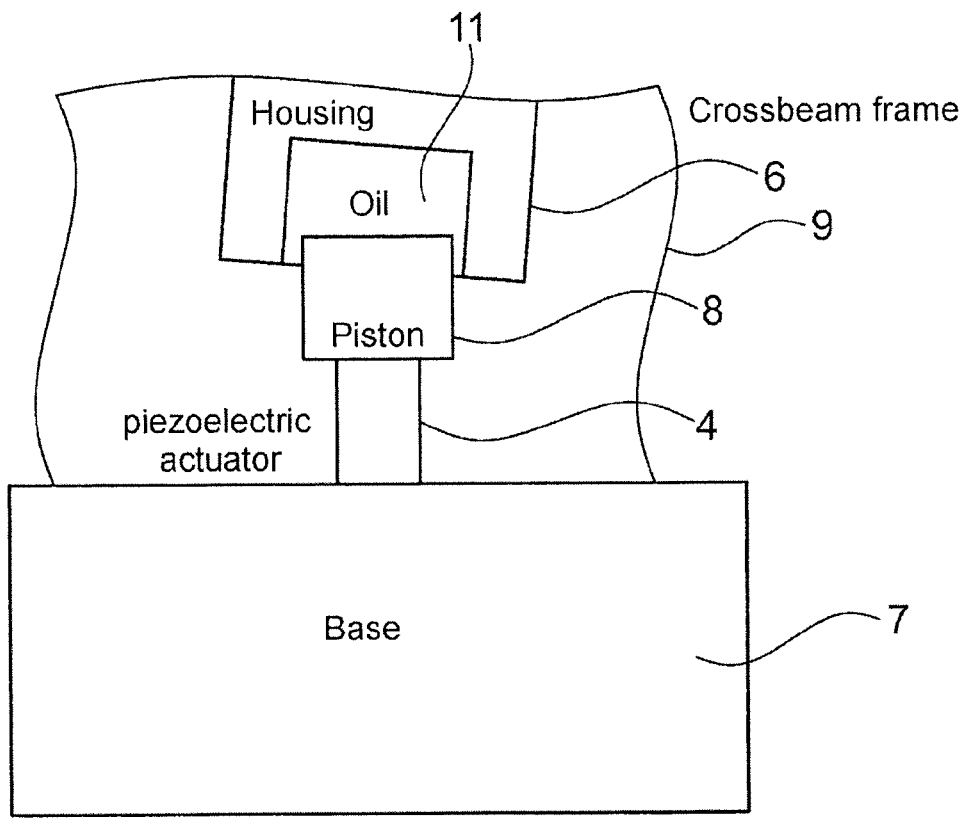

As illustrated schematically in FIG. 5, however, the mass of the housing 6 and crossbeam 9 also vibrate therewith in practice. This occurs in a highly uncontrolled manner and is therefore not suitable for a primary calibration.

No standardized primary calibration method is known for the dynamic behavior of pressure sensors. Accordingly, there is also no dynamically calibrated pressure normal that could be used for a secondary calibration.

SUMMARY OF THE INVENTION

The object of the invention is therefore to specify a method-side and device-side solution that enables a primary calibration of the dynamic behavior of a pressure sensor.

The object is achieved by a device of the type mentioned at the outset that is statically determined in each case only by a housing-actuator and actuator-piston connection, and the piston is sealed in the cylinder relative to the surrounding atmosphere by a seal and is arranged so as to be able to move in the seal. In contrast to the prior art, as illustrated in particular in FIG. 4, a connection to a base is dispensed with, and a free double oscillator is produced. The masses of the free double oscillator are connected to one another by way of the two elements fluid and actuator. The stiffnesses and the damping of the elements fluid and actuator add together. A desired movement is permitted for both masses. Due to the lack of a base, this movement is defined and easily able to be measured. The position of piston and housing is determined statically solely by the actuator or the housing of the actuator, in contrast to the prior art, in which a metal diaphragm is used for sealing purposes. By virtue of these, the system is statically overdetermined, that is to say the position of the masses housing and piston in relation to one another is defined not by one connection (housing of the actuator), but rather by two connections (housing of the piezoactuator+metal diaphragm).

The advantage of using a seal, in particular an elastomer seal, is that lower actuation forces are necessary to compress the oil. The piezoactuator is therefore able to be sized smaller, the system is generally more compact, and the vibrations are in turn more defined.

To receive the first pressure sensor, the housing may be provided with an opening between housing outer side and cylinder. In this case, the opening may be designed as a screw-in opening.

In a further refinement of the invention, it is provided, in the case of use for a primary calibration, for a measurement system that detects a movement of the piston relative to the housing to be arranged. As this is a free double oscillator, this relative movement advantageously has to be detected by determining the movement of the piston and of the housing. The movements are expediently measured directly at the location of the piston and of the housing, these directly adjoining the fluid.

In this case, it is advantageous if the measurement system is designed so as to detect both dynamic and static movements. Since static and dynamic piston movements need to be measured to calculate both the pressure and the volume, a plurality of measurement systems are able to be dispensed with by virtue of such a design.

According to a further refinement, the measurement system may be designed as a calibrated vibration sensor or as a laser vibrometer having speed and travel decoders.

In this case, the actuator may be designed as a hollow actuator having a beam passage through which the laser vibrometer is directed at the piston.

Since a dynamically primary-calibrated pressure sensor is able to be provided by the invention, said pressure sensor is then also able to perform a precise secondary calibration. To this end, it is provided, in the case of use in a secondary calibration, for the cylinder for receiving a fluid to be able to be connected to a second pressure sensor to be secondary-calibrated. In a secondary calibration with a primary-calibrated pressure sensor as reference sensor, the expenditure is able to be considerably reduced.

In this case, the housing may be provided with a second opening between housing outer side and cylinder for receiving the second pressure sensor. This second opening may again likewise be designed as a screw-in opening.

To perform the method according to the invention, a linear spindle generating a static admission pressure in the cylinder may be arranged.

As an alternative to the linear spindle, a second cylinder may also be provided in which there is arranged an adjusting piston that is sealed relative to the surrounding atmosphere and able to move in the second cylinder.

The object according to the invention is also achieved by a method for dynamically calibrating pressure sensors, as presented at the outset, wherein the pressure change $\Delta p$ corresponding to the actual value is calculated by way of the compression value K for the fluid, the effective pressure surface AK, the volume V0 of the cylinder filled with fluid, the piston displacement $\Delta xK$ and the displacement of the cylinder $\Delta xZ$ using $$\Delta p = K \frac{A_K (\Delta x_K - \Delta x_Z)}{V_0}.$$

The pressure change may then be compared with the value, representing the pressure, of the pressure sensor to be calibrated, to which the pressure and therefore the pressure change is applied. A calibration value may then be determined from this comparison. The pressure sensor is therefore calibrated directly with the value to be detected, that is to say primary-calibrated, and not by way of a comparison.

The pressure pn for different piston displacements xK(1) ... xK(n) and cylinder displacements xZ(1) ... xZ(n) may be calculated using $$(p_n - p_{n-1}) = K \cdot \frac{A_K \cdot ((x_{K(n)} - x_{K(n-1)}) + (x_{Z(n)} - x_{Z(n-1)}))}{V_0}, n \in \mathbb{N}.$$

It therefore becomes possible, using the method according to the invention, to perform a calibration with different static pressures.

The piston displacement $\Delta xK$ and the cylinder displacement $\Delta xZ$ may also be generated dynamically, that is to say as functions of time $\dot{x}_K = dx_K/dt$ $\dot{x}_Z$ $\dot{x}_Z = dx_Z/dt$. The dynamic pressure function $\dot{p} = dp/dt$ is then calculated using $$\dot{p} = K \cdot \frac{A_K (\dot{x}_K + \dot{x}_Z)}{V_0}.$$

In one variant of the generation of a dynamic pressure function, $\dot{x}_K$ and $\dot{x}_Z$ may be generated as a sinusoidal function at a frequency f.

In this case, it is also possible for $\dot{x}_K$ and $\dot{x}_Z$ to be generated at a varying frequency, that is to say $\dot{x}_K(f)$ and $\dot{x}_Z(f)$, and for the calibration value c to be generated by calculating a frequency-dependent pressure $\dot{p}(f)$ as a function c(f). It therefore becomes possible to determine a complete frequency response of the sensor.

In a first method variant, it is provided for the pressure in the cylinder to be overlaid with a dynamic pressure that is generated by the actuator. If $\dot{x}_K$ and $\dot{x}_Z$ are generated as a sinusoidal function at a frequency f, a static admission pressure is generated in the cylinder that lies above the surrounding pressure on which the dynamic pressure is then overlaid.

The values of the piston surface $A_K$, volume $V_0$, compression modulus K and time-dependent piston movement $\dot{x}_K$ and cylinder movement $\dot{X}_Z$ necessary for the pressure calculation using $$\dot{p} = K \cdot \frac{A_K (\dot{x}_K + \dot{x}_Z)}{V_0}$$

are determined as follows:
a) The surface $A_K$ is calculated using a diameter measurement of the piston.
b) The compression modulus K is defined using the fluid that is used, using documented table values.
The time-dependent piston movement $\dot{x}_K$ and the cylinder movement $\dot{x}_Z$ are determined. This may be performed through a separate measurement of their accelerations $\ddot{x}_K$ and $\ddot{x}_Z$, and then using the equation $$\dot{x}_K = \int \ddot{x}_K \text{ and } \dot{x}_Z = \int \ddot{x}_Z.$$

c) The volume $V_0$ is determined using a pressure sensor that is not necessarily dynamically calibrated. The volume $V_0$ is filled with a liquid fluid, preferably with oil. Two measurements of the dynamic pressure sensor output signal $\dot{U}$ are therefore performed in the cylinder. Between these measurements, the output volume is varied, but the static admission pressure, represented by the static output signal U at the pressure sensor, is set so as to be the same, that is to say to the same value as before the change in the output volume. The steps may be explained in even more detail: a first measurement is initially performed, wherein the piston movement and cylinder movement $\dot{x}_{K1}$, respectively $\dot{x}_{Z1}$, are measured, and a dynamic output parameter $\dot{U}_1$ at a frequency $f_1$ is determined at the pressure sensor. The volume of the cylinder is then changed by $\Delta V$. A second measurement of the dynamic output parameter $\dot{U}_2$ is then performed at the same frequency $f_2 = f_1$, wherein the piston movement and cylinder movement $\dot{x}_{K2}$, respectively $\dot{x}_{Z2}$, are measured, these being necessary to obtain the same dynamic output parameter, that is to say $\dot{U}_1 = \dot{U}_2$, at the pressure sensor. The volume $V_0$ may then be calculated using $$V_0 = \frac{\Delta V}{\frac{(\dot{x}_{K2} + \dot{x}_{Z2})}{(\dot{x}_{K1} + \dot{x}_{Z1})} - 1}.$$

In a second method variant, it is provided for the values of the piston surface $A_K$, volume $V_0$, compression modulus K and the time-dependent piston movement $\dot{x}_K$ and cylinder movement $\dot{x}_Z$ necessary for the pressure calculation using $$\dot{p} = K \cdot \frac{A_K (\dot{x}_K + \dot{x}_Z)}{V_0}$$

to be determined as follows:
a) The surface $A_K$ is calculated using a diameter measurement of the piston.

b) The compression modulus K is defined using the fluid that is used, using documented table values.

d) The time-dependent piston movement $\dot{x}_K$ and the cylinder movement $\dot{x}_Z$ are determined. This may be performed through a separate measurement of their accelerations $\ddot{x}_K$ and $\ddot{x}_Z$, and then using the equation $$\dot{x}_K = \int \ddot{x}_K \text{ and } \dot{x}_Z = \int \ddot{x}_Z.$$

c) The volume $V_0$ is determined using a pressure sensor that is not necessarily dynamically calibrated, but is necessarily statically calibrated. For the purpose of determining the volume $V_0$, the liquid fluid is replaced by a gaseous fluid. Two measurements of the static pressure $p_1$ and $p_2$ are therefore performed in the cylinder, between which the output volume is varied by $\Delta V$. In this case, a first measurement is initially performed, from which the static output parameter $U_1$ at the pressure sensor is determined. The volume of the cylinder is then changed by $\Delta V$ and a second measurement of the static output parameter $U_2$ is then performed. The volume $V_0$ is then calculated using $$V_0 = \frac{\Delta V}{\frac{p_2}{p_1} - 1}.$$

One refinement of the method makes provision, by way of a separate adjusting piston having a piston surface $A_{VK}$ that executes an adjustment movement with an adjustment travel $\Delta x_{VK}$, for the volume $V_0$ to be varied and calculated using $$V_0 = \frac{A_{VK} \cdot \Delta x_{VK}}{\frac{p_2}{p_1} - 1}.$$

In a third method variant, the complex determination of the volume $V_0$, as is necessary in the first and second method variants, may be dispensed with. In this case, the time-dependent piston movement $\dot{x}_K$ and the cylinder movement $\dot{x}_Z$ are generated and detected by way of a measurement system. The dynamic pressure function $\dot{p}$ is calculated using $$\dot{p} = K \cdot \frac{A_K(\dot{x}_K + \dot{x}_Z)}{V_0} = C_1 \cdot (\dot{x}_K + \dot{x}_Z)$$

wherein all of the constants are summarized in $C_1$, that is to say $$C_1 = K \cdot \frac{A_K}{V_0}.$$

Without separate determination of the individual variables, $C_1$ is now determined overall. This is performed by two static measurements of the pressure, of a necessarily statically calibrated pressure sensor in relation to the respective piston displacement $\Delta x_K$ and cylinder displacement $\Delta x_Z$, which are likewise measured. From this, the pressure difference $\Delta p$, the piston displacement $\Delta x_K$ and cylinder displacement $\Delta x_Z$ are determined and $C_1$ is calculated using $$C_1 = \frac{\Delta p}{\Delta x_K + \Delta x_Z}.$$

The piston displacement $\Delta x_K$ and the cylinder displacement $\Delta x_Z$ may also be selected using $\Delta x_K \gg \Delta x_Z$, the difference being at least one order of magnitude. The time-dependent pressure function $\dot{p}$ is then determined using the equations $$\dot{p} = K \cdot \frac{A_K \cdot \dot{x}_K}{V_0} = C_1 \cdot (\dot{x}_K)$$

wherein $C_1$ is determined through two static measurements of the pressure, of a necessarily statically calibrated pressure sensor in relation to the respective piston displacement $\Delta x_K$ and, from this, the pressure difference $\Delta p$ and $C_1$ is calculated using $$C_1 = \frac{\Delta p}{\Delta x_K}.$$

The invention makes it possible to dynamically primary-calibrate a pressure sensor. The solution according to the invention therefore also provides for such a primary-calibrated sensor having a calibration value c, which is now known, to be used as a first pressure sensor for a secondary calibration of a second pressure sensor. Expenditure on the device side and on the method side is thus considerably reduced.

BRIEF DESCRIPTION OF THE DRAWING FIGURES

Figure 2:
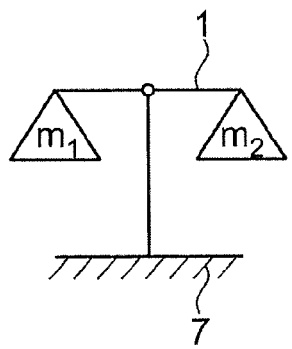
Figure 4:
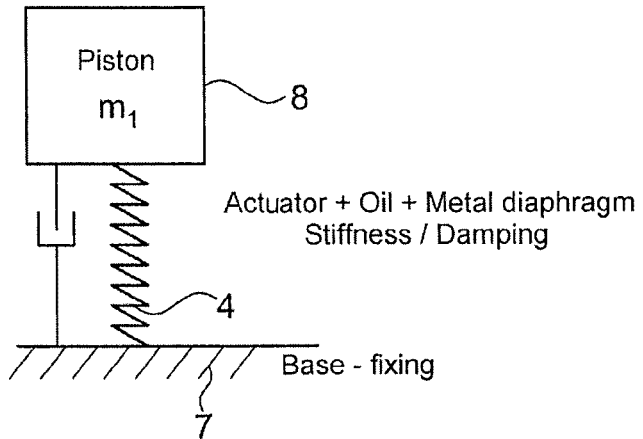
Figure 6:
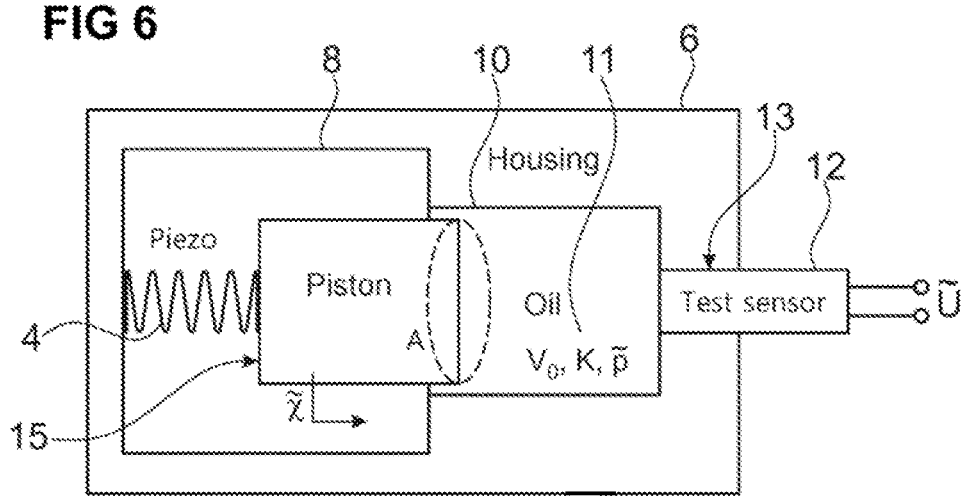
Figure 7:
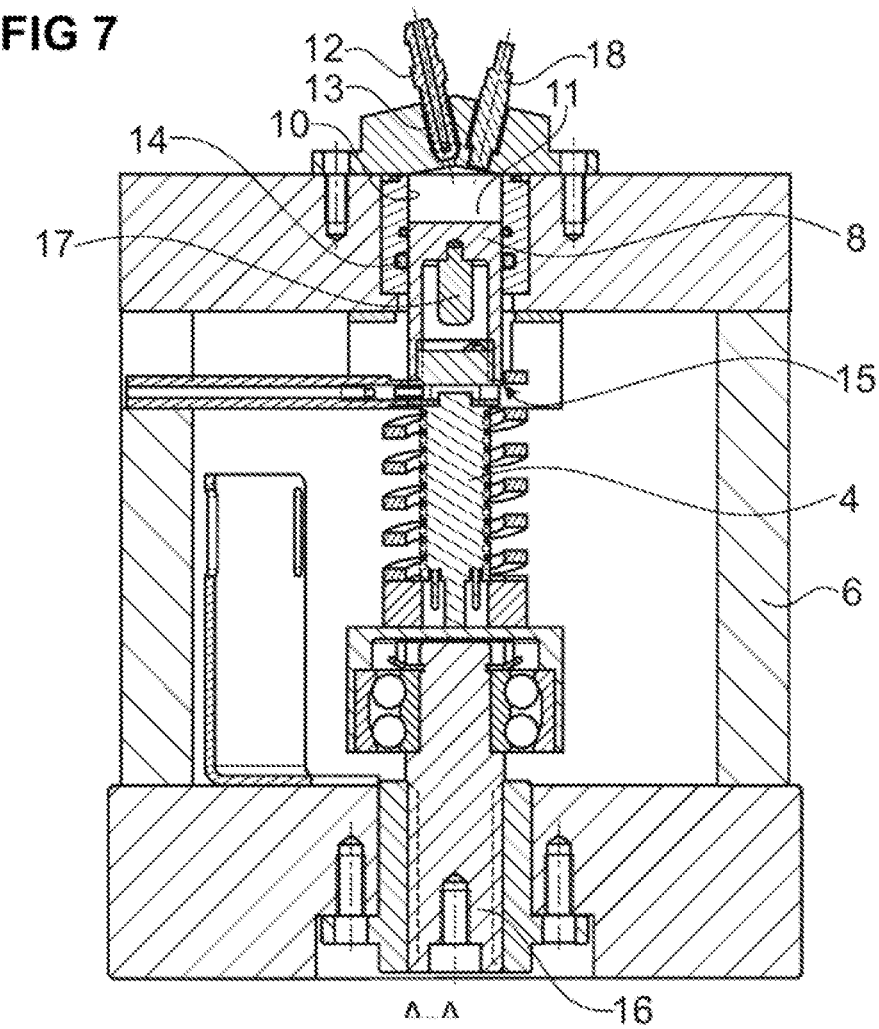
Figure 8:
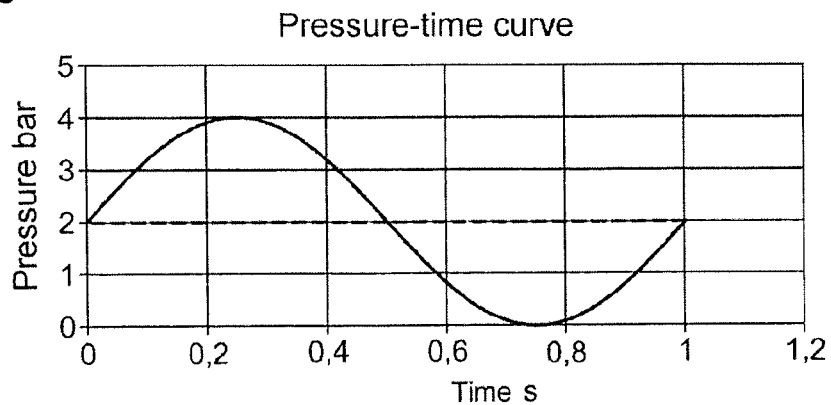
Figure 9:
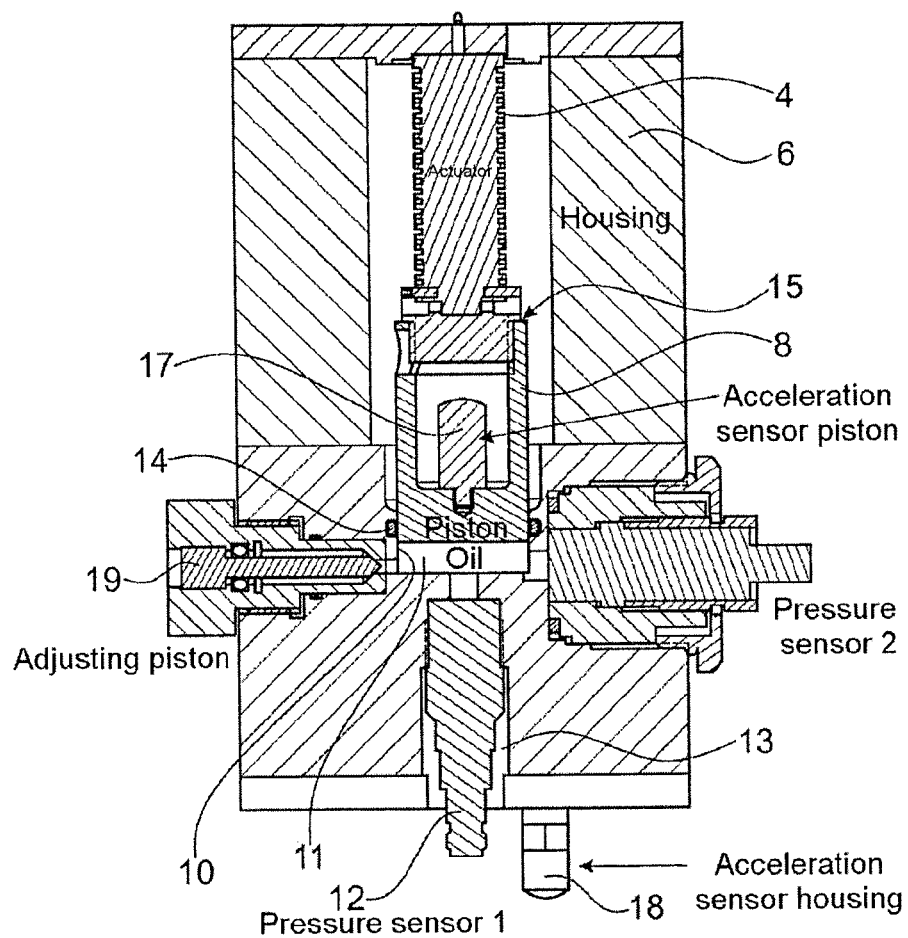
Figure 10:
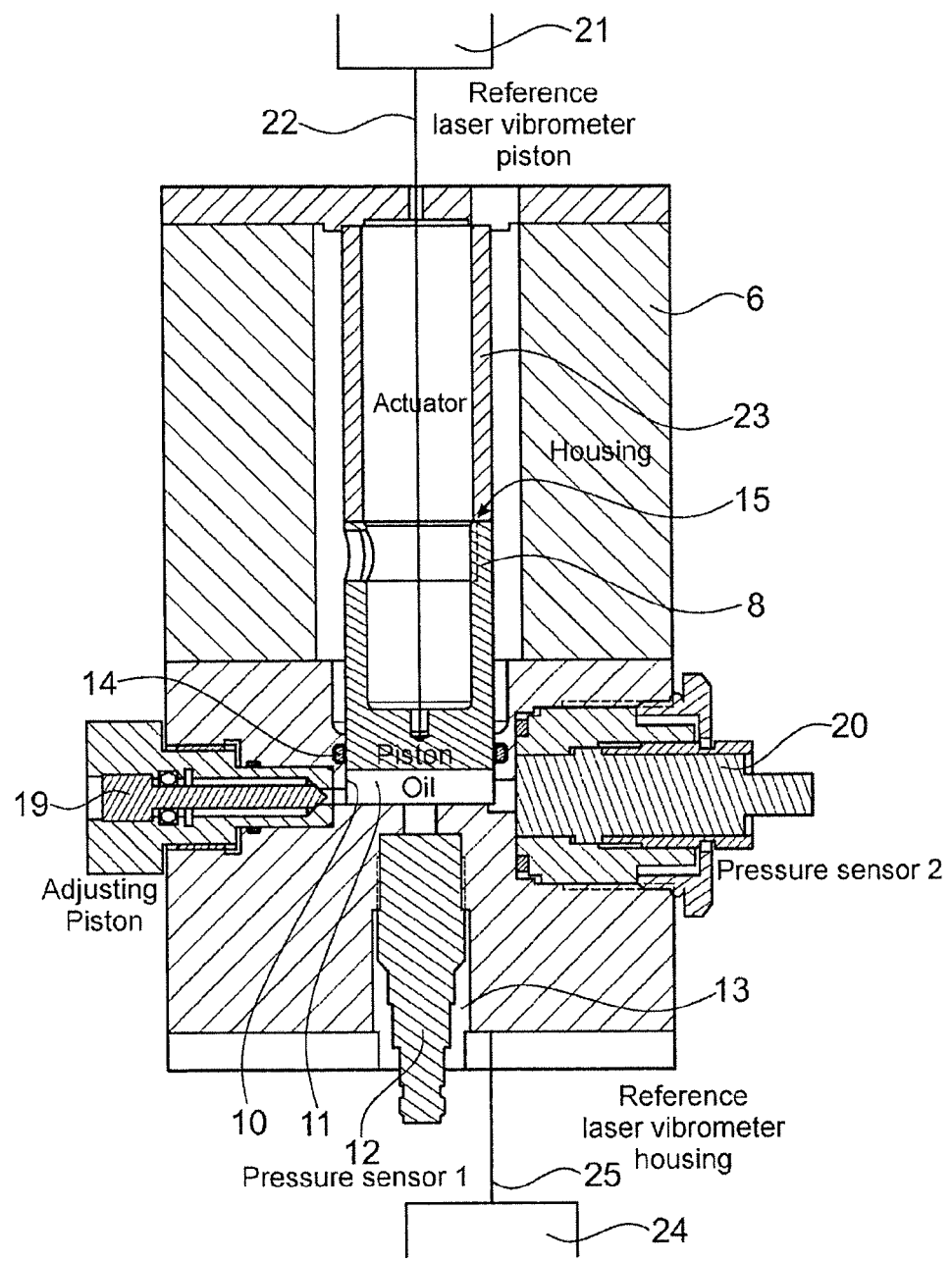

The invention is intended to be explained in more detail below with reference to exemplary embodiments. In the associated figures:

FIG. 1 shows a frequency response of a vibration sensor having a deviation in relation to a sensitivity at 160 Hz, FIG. 2 shows an illustration of the functional principle of a secondary calibration, FIG. 3 shows a piezoelectrically driven pressure generator according to the prior art, FIG. 4 shows a mechanical circuit diagram of a pressure generator according to the prior art, FIG. 5 shows a schematic illustration of the effect of a base connection according to the prior art, FIG. 6 shows a schematic illustration of the functional principle of the solution according to the invention, FIG. 7 shows a structure of a calibration device according to the invention, according to a first exemplary embodiment, FIG. 8 shows a time-pressure curve of a dynamic application of pressure to a pressure sensor to be calibrated, FIG. 9 shows a structure of a calibration device according to the invention, according to a second exemplary embodiment, and FIG. 10 shows a structure of a calibration device according to the invention, according to a third exemplary embodiment.

DETAILED DESCRIPTION

FIG. 6 shows an illustration of the principle of a solution according to the invention. The device has a housing 6 and a cylinder 10, connected to the housing, for receiving a fluid, in particular oil, such as hydraulic oil. The cylinder 10 is able to be connected to a first pressure sensor 12. The first pressure sensor 12 may be connected to the cylinder 10 via a first opening 13, in particular a screw opening, and is therefore in contact with the fluid 11. The first pressure sensor 12 is the sensor that is intended to be primary-calibrated.

A piston 8 is furthermore provided that interacts with the cylinder 10 such that it is sealed in the cylinder relative to the surrounding atmosphere by a seal 14 and is arranged so as to be able to move in the seal 14. The piston 8 is therefore able to press directly on the fluid 11 and set a pressure in the cylinder 10. The piston 8 is driven by a piezoelectric actuator 4 that is arranged between housing 6 and a side 15, facing away from the cylinder 10, of the piston 8.

The device does not have a connection to a larger mass, in particular to a base. It is therefore statically determined only by the connection of housing 6 to actuator 4 and actuator 4 to piston 8.

The actuator 4 that is used converts an input signal in the form of a function, not shown in any more detail, into a mechanical deformation that is transferred to the piston 8 in the form of a mechanical movement.

The structure of a device according to the invention, as illustrated in FIG. 7, has all of the elements that are shown in the principle illustration according to FIG. 6. Identical reference signs indicate identical elements, such as housing 6, piston 8, cylinder 10, fluid 11, first pressure sensor 12, first opening 13, seal 14 and side 15, facing away from the cylinder, of the piston 8. In addition, a linear spindle 16 acting on the actuator is provided, which makes it possible to set an admission pressure in the cylinder 10. Said admission pressure is then overlaid with the dynamic pressure that is generated by the actuator 4. The pressure profile shown in FIG. 8 is thus able to be produced.

Due to various influences, it is desirable for the oil volume to be very small so as to increase the precision of the structure. However, in return, this means that even at a very small piston travel ($\approx 0.1$ μm), sufficiently high pressures are generated. Measuring this travel with sufficient accuracy constitutes a significant challenge. The invention therefore makes provision to use vibration sensors 17, 18. These are able to be calibrated very precisely. The sought travel is then able to be calculated by way of measured accelerations.

A measurement system detecting a movement of the piston relative to the housing therefore consists of a first vibration sensor 17 that is connected to the piston and a second vibration sensor 18 that is connected to the housing. The piston travel is then determined by way of the output signals output by the vibration sensors 17, 18, according to the method according to the invention. The time-dependent piston movement $\dot{x}_K$ is determined by way of the acceleration-equivalent output signal of the first vibration sensor 17 and the cylinder movement $\dot{x}_Z$ is determined by way of the acceleration-equivalent output signal of the second vibration sensor 18. This is performed through a separate measurement of their accelerations $\ddot{x}_K$ and $\ddot{x}_Z$, and then using the equation $$\dot{x}_K = \int \ddot{x}_K \text{ and } \dot{x}_Z = \int \ddot{x}_Z.$$

Depending on the sensitivity of the sensor, it is possible to measure the travel only above sufficiently high frequencies. Due to the spatial restrictions in the piston, only a very small sensor is able to be used.

The pressure calculation for calibrating the first pressure sensor 12 is performed, in this exemplary embodiment, as described under "first method variant".

If the first pressure sensor 12 is dynamically primary-calibrated, it may be used as a reference sensor for a second pressure sensor 20 for a secondary calibration.

The structure of a device according to the invention, as illustrated in FIG. 9, has all of the elements that are shown in the principle illustration according to FIG. 6. Identical reference signs indicate identical elements, such as housing 6, piston 8, cylinder 10, fluid 11, first pressure sensor 12, first opening 13, seal 14 and side 15, facing away from the cylinder, of the piston 8. In addition, an adjusting piston 19 acting on the cylinder 10 is provided, which makes it possible to set an admission pressure in the cylinder 10. Said admission pressure is then overlaid with the dynamic pressure that is generated by the actuator 4. The pressure profile shown in FIG. 8 is thus able to be produced.

The time-dependent piston movement $\dot{x}_K$ is also determined in this exemplary embodiment by way of the acceleration-equivalent output signal of the first vibration sensor 17 and the cylinder movement $\dot{x}_Z$ is determined by way of the acceleration-equivalent output signal of the second vibration sensor 18. This is performed through a separate measurement of their accelerations $\ddot{x}_K$ and $\ddot{x}_Z$, and then using the equation $$\dot{x}_K = \int \ddot{x}_K \text{ and } \dot{x}_Z = \int \ddot{x}_Z.$$

It is pointed out at this juncture that the cylinder movement may sometimes be very much smaller and, for possibly sufficient accuracy, negligibly smaller than the piston movement. In this case, it is possible to dispense with determining the cylinder movement $\dot{x}_Z$. In this case, it is also possible to dispense with second the vibration sensor 18.

The pressure calculation for calibrating the first pressure sensor 12 is performed, in the exemplary embodiment according to FIG. 9, as described under "second method variant".

The structure of a device according to the invention, as illustrated in FIG. 10, has all of the elements that are shown in the principle illustration according to FIG. 6. Identical reference signs indicate identical elements, such as housing 6, piston 8, cylinder 10, fluid 11, first pressure sensor 12, first opening 13, seal 14 and side 15, facing away from the cylinder, of the piston 8. In addition, an adjusting piston 19 acting on the cylinder 10 is provided, which makes it possible to set an admission pressure in the cylinder 10. Said admission pressure is then overlaid with the dynamic pressure that is generated by the actuator 4. The pressure profile shown in FIG. 8 is thus able to be produced.

The aim of the exemplary embodiment according to FIG. 10 is to expand the frequency range, which is up to now limited by the vibration sensors 17 and 18 used in the exemplary embodiments according to FIG. 7 and FIG. 9. The intention is in particular to expand the frequency range to small frequencies of down to f=0 Hz. Since there are calibration methods for the static calibration of pressure sensors, by way of expanding the frequency range to f=0 Hz, it is possible to connect the dynamic method to the static one and therefore also possible to compare the determined values.

To achieve this, in the exemplary embodiment according to FIG. 10, the vibration sensors 17 and 18 in FIGS. 7 and 9 have been replaced by a laser vibrometer 21 and a second laser vibrometer 24. These are capable of measuring far smaller accelerations than the previously shown vibration sensors 17 and 18.

To allow the laser beam 22 of the laser vibrometer 21 to impinge directly on the piston, the actuator is designed as a hollow actuator 23. The laser beam 25 of the second laser vibrometer 24 impinges directly on the housing 6.

The laser vibrometer 21 is furthermore also capable of performing static measurements of the piston displacement with very high accuracy. This is a significant advantage over the exemplary embodiments shown above. The same applies for the second laser vibrometer 24.

The pressure calculation for calibrating the first pressure sensor 12 is performed, in the exemplary embodiment according to FIG. 10, as described under "third method variant".

In this case too, it is possible, in the presence of dynamic primary calibration of the first pressure sensor 12, to dynamically secondary-calibrate a second pressure sensor 20. The laser vibrometers 21 and 24 are then able to be dispensed with in such a secondary calibration.

The particular features of the invention may be summarized as follows:

A pistonphone (piston-cylinder system) is used.
A free double oscillator system is produced.
Movement at piston 8 and housing 6 is made possible.
The displacement of the piston 8 and of the housing 6 is measured at two measurement points.
This is a statically determined system, since piston 8 and housing 6 are only connected via the housing 6, respectively the actuator 4, itself. To this end, a seal 14, in particular an elastomer seal is used.
An adjusting piston 19 is provided, by way of which it is possible to generate a static pressure increase. The static pressure increase is mandatorily necessary in order:
  to generate pressure amplitudes of greater than 1 bar, and
  to produce defined calibration conditions in the structure (in particular to achieve a defined compression modulus K).

LIST OF REFERENCE SIGNS 1 beam
2 control volume
3 diaphragm
4 actuator
5 comparison sensor
6 housing
7 base
8 piston
9 crossbeam
10 cylinder
11 fluid
12 first pressure sensor
13 first opening
14 seal
15 side, facing away from the cylinder, of the piston
16 linear spindle
17 first vibration sensor
18 second vibration sensor
19 adjusting piston
20 second pressure sensor
21 laser vibrometer
22 laser beam
23 hollow actuator
24 second laser vibrometer
25 laser beam of the second laser vibrometer

The invention claimed is:

1. A device for dynamically calibrating pressure sensors comprising a housing, a cylinder, connected to the housing, for receiving a fluid, which cylinder is able to be connected, via a first opening, to a first pressure sensor, which is therefore in contact with the fluid, an actuator and a piston interacting with the cylinder, wherein the actuator is arranged between the housing and a side, facing away from the cylinder, of the piston, characterized in that
  the device is statically determined in each case only by a housing actuator and actuator piston connection, since it does not have a connection to a base
  the actuator is designed as a piezoelectric actuator, and
  the piston is sealed in the cylinder relative to the surrounding atmosphere by a seal and is arranged so as to be able to move in the seal.

2. The device as claimed in claim 1, characterized in that, in the case of use for a primary calibration, a measurement system that detects a movement of the piston relative to the housing is arranged.

3. The device as claimed in claim 2, characterized in that the measurement system is designed so as to detect both dynamic and static movements.

4. The device as claimed in claim 2, characterized in that the measurement system is designed as a calibrated vibration sensor or as a laser vibrometer having speed and travel decoders.

5. The device as claimed in claim 4, characterized in that the actuator is designed as a hollow actuator having a beam passage through which the laser vibrometer is directed at the piston.

6. The device as claimed in claim 1, characterized in that, in the case of use in a secondary calibration, the cylinder for receiving a fluid is able to be connected to a second pressure sensor to be secondary-calibrated.

7. The device as claimed in claim 1, characterized in that a linear spindle generating a static admission pressure in the cylinder is arranged.

8. The device as claimed in claim 1, characterized in that a second cylinder is provided in the housing in which there is arranged an adjusting piston that is sealed relative to the surrounding atmosphere and able to move in the second cylinder.

9. The method as claimed in claim 8, characterized in that the variables piston surface A, volume $V_0$, compression modulus K and time-dependent piston movement $\dot{x}_K$ and cylinder movement $\dot{x}_2$ are determined by
  calculating the surface A using a diameter measurement of the piston,
  defining the compression modulus K using the fluid that is used, using documented table values,
  determining the time-dependent piston movement $\dot{x}_K$ and the cylinder movement $\dot{x}_Z$,
  calculating the volume $V_0$ using the first pressure sensor wherein the first sensor is statically calibrated,
    wherein, for the purpose of determining the volume V0, the liquid fluid is replaced by a gaseous fluid,
    two measurements of the static pressure $p_1$ and $p_2$ are performed in the cylinder, between which the output volume is varied by $\Delta V$, wherein a first measurement is initially performed, from which the static output parameter $U_1$ at the pressure sensor is determined, that the volume of the cylinder (10) is changed by $\Delta V$ and a second measurement of the static output parameter $U_2$ is performed, and the volume $V_0$ is calculated using $$V_0 = \frac{\Delta V}{\frac{p_2}{p_1} - 1}.$$

10. The method as claimed in claim 9, characterized in that, by way of a separate adjusting piston having a piston surface $A_{VK}$ that executes an adjustment movement with an adjustment travel $\Delta x_{VK}$, the volume $V_0$ is varied and calculated using $$V_0 = \frac{A_{VK} \cdot \Delta x_{VK}}{\frac{p_2}{p_1} - 1}.$$

11. A method for dynamically calibrating pressure sensors using the device of claim 1, wherein an actual parameter representing the pressure acting on the pressure sensor is measured and compared with a corresponding setpoint parameter, and a calibration value c for the actual parameter is determined from the comparison, the pressure being generated by way of the piston interacting with the cylinder that is filled with the fluid, characterized in that the pressure change $\Delta p$ corresponding to the actual value is calculated by way of the compression value K for the fluid, the effective pressure surface $A_K$, the volume $V_0$ of the cylinder filled with fluid, the piston displacement $\Delta x_K$ and the displacement of the cylinder $\Delta x_Z$ using $$\Delta p = K \frac{A_K(\Delta x_K - \Delta x_Z)}{V_0}.$$

12. The method as claimed in claim 11, characterized in that the pressure $p_n$ for different piston displacements $x_{K(1)} \ldots x_{K(n)}$ and cylinder displacements $x_{Z(1)} \ldots x_{Z(N)}$ is calculated using $$(p_n - p_{n-1}) = K \cdot \frac{A_K \cdot ((x_{K(n)} - x_{K(n-1)}) + (x_{Z(n)} - x_{Z(n-1)}))}{V_0}, n \in \mathbb{N}.$$

13. The method as claimed in claim 11, characterized in that the piston displacement $\Delta x_K$ and the cylinder displacement $\Delta x_Z$ are generated dynamically, that is to say as functions of time $\dot{x}_K = dx_K/dt$ and $\dot{x}_Z = dx_Z/dt$, and the dynamic pressure function $\dot{p} = dp/dt$ is calculated using $$\dot{p} = K \cdot \frac{A_K(\dot{x}_K + \dot{x}_Z)}{V_0}.$$

14. The method as claimed in claim 13, characterized in that $\dot{x}_K$ and $\dot{x}_Z$ are generated as a sinusoidal function at a frequency f.

15. The method as claimed in claim 14, characterized in that $\dot{x}_K$ and $\dot{x}_Z$ are generated at a varying frequency, that is to say $\dot{x}_K(f)$ and $\dot{x}_Z(f)$, and the calibration value is generated by calculating a frequency-dependent pressure $\dot{p}(f)$ as a function c(f).

16. The method as claimed in claim 11, characterized in that the pressure in the cylinder is overlaid with a dynamic pressure that is generated by the actuator, the variables piston surface A, volume $V_0$, compression modulus K and time-dependent piston movement $\dot{x}_K$ and cylinder movement $\dot{x}_Z$ are determined by calculating the surface A using a diameter measurement of the piston, defining the compression modulus K using the fluid that is used, using documented table values, determining the time-dependent piston movement $\dot{x}_K$ and the cylinder movement $\dot{x}_Z$ calculating the volume $V_0$ using the first pressure sensor wherein two measurements of the dynamic pressure sensor output signal $\dot{U}$ are performed in the cylinder, between which the output volume is varied, but the static admission pressure, represented by the static output signal U at the first pressure sensor, is set so as to be the same, wherein a first measurement is initially performed, wherein the piston movement and cylinder movement $\dot{x}_{K1}$, respectively $\dot{x}_{Z1}$, are measured, and a dynamic output parameter $\dot{U}_1$ at a frequency $f_1$ i is determined at the pressure sensor, and the volume of the cylinder is then changed by $\Delta V$, and a second measurement of the dynamic output parameter $\dot{U}_2$ is then performed at the same frequency $f_2=f_1$, wherein the piston movement and cylinder movement $\dot{x}_{K2}$, respectively $\dot{x}_{Z2}$, are measured, these being necessary to obtain the same dynamic output parameter, that is to say $\dot{U}_1=\dot{U}_2$, at the first pressure sensor, and the volume V0 is then calculated using $$V_0 = \frac{\Delta V}{\frac{(\dot{x}_{K2} + \dot{x}_{Z2})}{(\dot{x}_{K1} + \dot{x}_{Z1})} - 1}.$$

17. The method as claimed in claim 11, characterized in that the time-dependent piston movement $\dot{x}_K$ and the cylinder movement $\dot{x}_Z$ are generated and detected by way of a measurement system, the dynamic pressure function $\dot{P}$ is calculated using $$\dot{p} = K \cdot \frac{A_K(\dot{x}_K + \dot{x}_Z)}{V_0} = C_1 \cdot (\dot{x}_K + \dot{x}_Z)$$

wherein $C_1$ is determined through two static measurements of the pressure, of a necessarily statically calibrated pressure sensor in relation to the respective piston displacement $\Delta x_K$ and cylinder displacement $\Delta x_Z$ and, from this, the pressure difference $\Delta p$ and the piston displacement $\Delta x_K$ and cylinder displacement $\Delta x_Z$ are determined and $C_1$ is calculated using $$C_1 = \frac{\Delta p}{\Delta x_K + \Delta x_Z}.$$

18. The method as claimed in claim 11, characterized in that a subsequently primary-calibrated sensor with a calibration value c, which is now known, is used as a first pressure sensor for a secondary calibration of a second pressure sensor.

* * * * *

UNITED STATES PATENT AND TRADEMARK OFFICE
CERTIFICATE OF CORRECTION

PATENT NO. : 10,775,257 B2  Page 1 of 1
APPLICATION NO. : 16/335749
DATED : September 15, 2020
INVENTOR(S) : Platte et al.

It is certified that error appears in the above-identified patent and that said Letters Patent is hereby corrected as shown below:

In the Specification

Column 5, Line 19: Delete "V0" and insert -- $V_0$ --

In the Claims

Column 12, Line 57: Claim 9, Delete "V0" and insert -- $V_0$ --

Column 14, Line 29: Claim 16, Delete "V0" and insert -- $V_0$ --

Signed and Sealed this
Twenty-fourth Day of November, 2020

Andrei Iancu
*Director of the United States Patent and Trademark Office*